United States Patent [19]

Picot

[11] Patent Number: 4,948,050

[45] Date of Patent: Aug. 14, 1990

[54] LIQUID ATOMIZING APPARATUS FOR AERIAL SPRAYING

[76] Inventor: Jules J. C. Picot, Simcoe Court, Fredericton, N.B. E3B 2W9, Canada

[21] Appl. No.: 306,425

[22] Filed: Feb. 6, 1989

[51] Int. Cl.$^5$ ............................................... B64D 1/18
[52] U.S. Cl. .................................... 239/171; 239/162; 244/136
[58] Field of Search ............... 239/171, 155, 162, 670; 244/136

[56] References Cited

U.S. PATENT DOCUMENTS

| | | | |
|---|---|---|---|
| 2,528,986 | 11/1950 | Adams | 239/171 |
| 2,721,102 | 10/1955 | Nissen | 244/136 |
| 3,429,510 | 2/1969 | Taylor | 244/136 |
| 3,452,931 | 7/1969 | Knowles | 239/171 |
| 3,869,655 | 3/1975 | Sousek | 239/670 |
| 3,968,933 | 7/1976 | Waldrum | 239/171 |

FOREIGN PATENT DOCUMENTS 141689  6/1951  Australia ........................... 239/162

*Primary Examiner*—Andres Kashnikow
*Assistant Examiner*—Michael J. Forman
*Attorney, Agent, or Firm*—McFadden, Fincham, Marcus & Allen

[57] ABSTRACT

A rotary liquid spray atomizer for aerial spraying is driven by a variable speed motor, driven in turn by power from a variable speed AC generator. The generator is driven from a power take-off from the engine of the spraying aircraft, a drive assembly includes a device for controlling the speed of the generator relative to the speed of the engine. The particularly convenient drive assembly between the generator and the power take-off is a hydraulic motor, which drives the generator, driven by a hydraulic pump driven from the power take-off. The speed of the hydraulic motor can be controllably varied. Conveniently the AC motor is a synchronous motor.

7 Claims, 1 Drawing Sheet

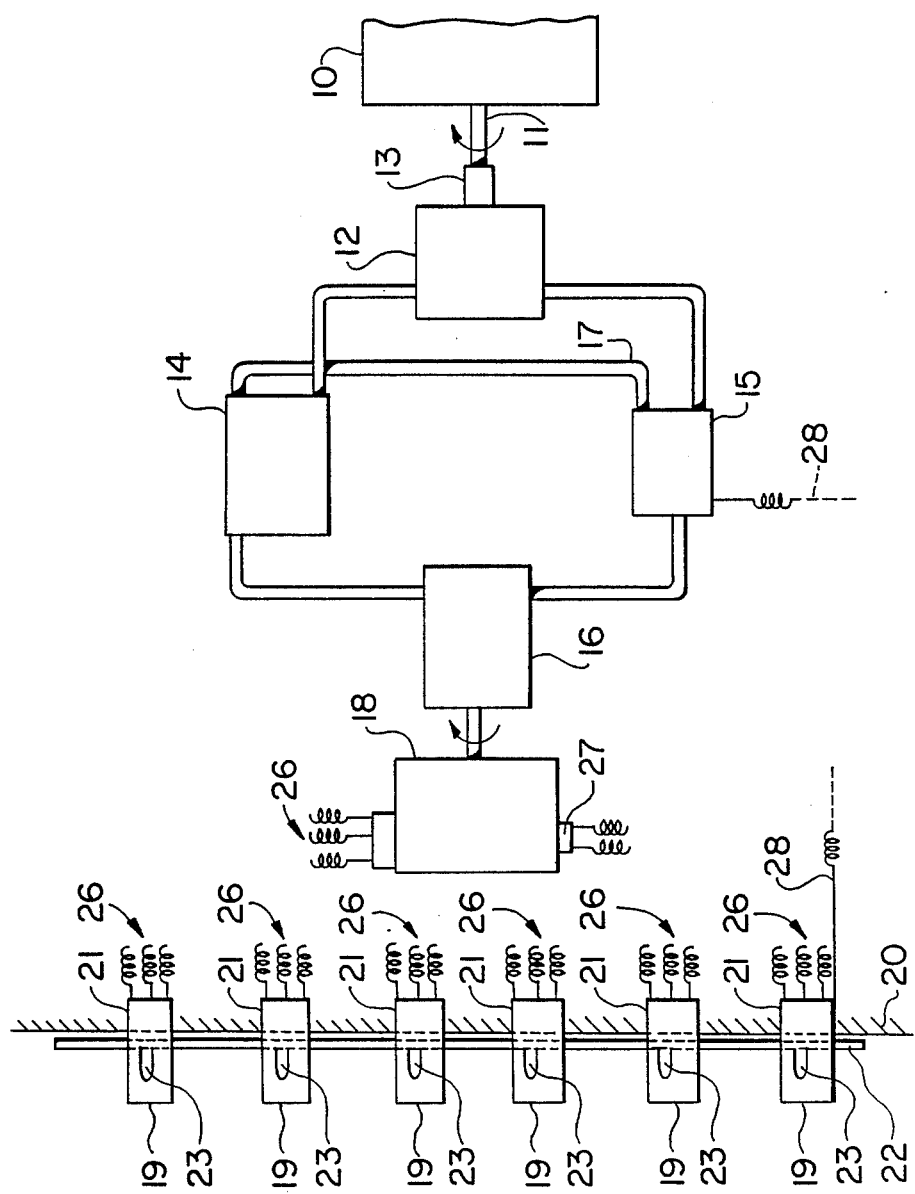

LIQUID ATOMIZING APPARATUS FOR AERIAL SPRAYING

FIELD OF THE INVENTION

This invention relates to a liquid atomizing apparatus for aerial spraying, and in particular relates to the provision of apparatus which will give a liquid or solid-in-liquid suspension spray having predetermined characteristics independent of the speed of the aircraft carrying out the spraying.

SUMMARY OF THE INVENTION

In a conventional spray system, a series of rotatable baskets are assembled on a wing of the aircraft. In this system, each basket is rotated by a propeller which is rotated by the passage of the aircraft through the air. The liquid to be sprayed is fed into the baskets. The baskets are perforated and the fluid is emitted centrifugally through the perforations. The droplet size is very dependent on the speed of rotation of the basket.

With the speed of rotation of the basket being determined by plane speed, the droplet size is determined. When the plane varies speed, for example slowing down to turn round or other manoeuvre, the droplet size increases. This is inefficient in that more liquid is required to cover an area with large drops rather than with small drops, since it has been determined that a range of drop sizes between 15 microns and 55 microns is most desirable for aerial spraying of coniferous tree foliage.

A further disadvantage is the drag occasioned by the propellers for the atomizing devices, increasing fuel consumption.

PREFERRED FEATURES OF THE INVENTION

The present invention provides for the atomizers to be driven by an electrical motor. DC motors have been used but require heavy current supply not readily available on many aircraft. In the present invention, the atomizers are driven by relatively high voltage AC motors, preferably synchronous motors, the power for which is supplied from an AC generator which is driven from a power take-off on an aircraft engine by a variable speed system. Preferably, the generator driven by a hydraulic motor which is driven by a hydraulic pump, driven by a power take-off, on an engine of the aircraft. A fluid control system is provided for controlling the speed of the hydraulic motor with the input of a frequency signal from a tachometer associated with at least one of the spraying units. This is then universally applicable to any aircraft with a power take-off attachment point.

In its broadest concept, a liquid atomizing apparatus for aerial spraying comprises a rotatable atomizer, a variable speed AC motor driving the atomizer, an AC generator for producing electric power to drive the motor at a speed relating to the power generator, and a drive means for connection between the generator and a power take-off of an engine of an aircraft used for aerial spraying, drive means including means for controlling the speed of the generator relative to the speed of the engine.

In accordance with a particularly preferred embodiment of the present invention, a fluid atomizing apparatus for aerial spraying comprises: at least one rotatable liquid atomizer driven by a synchronous AC electric motor; an AC generator for producing electrical power for driving electric motor; a variable speed hydraulic motor for driving said AC generator; a hydraulic pump connected to said hydraulic motor and control means between said pump and said motor for variably controlling the flow of liquid from the pump to the motor; and means for connecting the hydraulic pump to a power take-off on an engine of an aircraft.

A preferred embodiment of the invention discloses a method of aerial spraying comprising providing an aerial spraying aircraft with a liquid atomizing apparatus, said apparatus including a rotatable atomizer; a variable speed AC electric motor for driving said atomizer; an AC generator for producing electric power to drive said electric motor at a speed related to the speed of said generator; and drive means for connection between said generator and a power take-off of an engine of an aircraft used for aerial spraying, said drive means including means for controlling the speed of said generator relative to the speed of said engine, connecting said drive means to said power take-off of said aircraft engine, to actuate said pump means when the aircraft engine is operating to drive said motor means, and controlling the speed of said motor means by controlling the output of said AC generator while controlling the output of said pump means to thereby drive said rotatable liquid atomizer and dispense atomizer spray.

DESCRIPTION OF THE VIEW OF THE DRAWING:

The invention will be readily understood by the following description in conjunction with the accompanying drawing which is a diagrammatic illustration of one system, or form of apparatus.

DETAILED DESCRIPTION WITH RESPECT TO THE DRAWINGS:

In the drawing, an engine is indicated at 10 with a power take-off at 11. A hydraulic pump 12 is connected to the power take-off 11 by a connector 13. Liquid, typically oil, is fed to the pump 12 from a reservoir 14, oil from the pump going via a hydraulic fluid control system 15 to hydraulic motor 16. Oil returns to the reservoir 14 from the motor 16. A bypass 17 extends between the control system 15 and the reservoir 14. The fluid control system 15 can be manually controlled, auto-controlled, or both.

The hydraulic motor 16 drives an AC generator 18. A plurality of rotating screen atomizers 19 are shown attached at a wing, depicted generally at 20. Each atomizer is driven by a variable speed AC motor 21.

Liquid is fed to each atomizer through a pipe 22 and flexible tubes 23. Electrical connections 26 extend between generator 18 and motors 21. Exitation is provided at 27. Typically the generator produces power at 208 V, 400 $H_z$, three phase at 4000 R.P.M.

In the example illustrated, a tachometer connection 28 is provided on at least one of the motors 21, and is connected to the control system 15.

The hydraulic pump provides a controlled, variable oil flow to the hydraulic motor, to drive the generator 18 at a controlled, variable speed to produce the desired voltage and frequency for operation of the atomizers at a required speed of rotation.

The power required is easily generated, and there is reduced drag on the aircraft. It is possible to maintain the speed of the atomizers constant, and therefor the droplet size is also constant. The invention is very suitable for small fields and similar areas, where a constant aircraft speed is not readily achieved during the spray application. The invention can be applied to helicopters, where other aircraft could not be conveniently used.

The number of atomizers used can vary according to requirements. Where, for any reason, it is desired to alter the droplet size, this can very readily be provided by adjustment of the control system 15. It is not necessary to change the atomizer. The speed of the electric motors, and atomizers, is independent of the speed of the engine 10 and of the forward speed of the aircraft.

The hydraulic pump 12, control system 15, hydraulic motor 16 and reservoir 14 can be made into a unitary assembly for mounting on the aircraft, and conceivably could be mounted on the engine which is driving the pump 12. Existing structure on an aircraft for holding conventional atomizer sprays can be used for mounting the electrically driven atomizers used with the present invention. The existing spray liquid containers and feed mechanism can be utilized, enabling the invention to be used on existing spraying aircraft.

I claim:

1. A liquid atomizing apparatus for aerial spraying comprising:

a rotatable atomizer;

a variable speed AC electric motor for driving said atomizer;

an AC generator for producing electric power to drive said electric motor at a speed related to the speed of said generator; and variable speed drive means for connection between said generator and a power take-off of an engine of an aircraft used for aerial spraying, said drive means including means for controllably varying the speed of a motor means, said motor means controllably varying the speed of said generator relative to the speed of said engine.

2. A liquid atomizing apparatus for aerial spraying comprising:

a rotatable atomizer;

a variable speed AC electric motor for driving said atomizer;

an AC generator for producing electric power to drive said electric motor at a speed related to the speed of said generator; and variable speed drive means for connection between said generator and a power take-off of an engine of an aircraft used for aerial spraying, said drive means including means for controllably varying the speed of said generator relative to the speed of said engine, said variable speed drive means includes a variable speed hydraulic motor, pump means connected to said variable speed hydraulic motor, and control means positioned between said pump means and said variable speed hydraulic motor for controlling the flow of liquid from the pump means to the hydraulic motor to vary the speed thereof.

3. An apparatus as claimed in claim 2, including means for feeding an output from said variable speed AC electric motor, indicative of the speed of said variable speed AC electric motor, to said control means.

4. An apparatus as claimed in claim 2, comprising a plurality of atomizers each driven by a variable speed synchronous AC motor, and means for connecting each AC motor to said generator.

5. An apparatus as claimed in claim 2, said pump means comprising an hydraulic pump, and including:

a hydraulic liquid reservoir;

means connecting an outlet of said reservoir to an inlet of said hydraulic pump;

a pipe connecting an outlet of said hydraulic pump to an inlet of said control means;

a pipe connecting an outlet of said control system to an inlet of said hydraulic motor;

and a pipe connecting an outlet of said hydraulic pump to an inlet of said reservoir.

6. An apparatus as claimed in claim 5, including bypass means extending between said control means and said reservoir.

7. An apparatus as claimed in claim 5, wherein said reservoir, said hydraulic pump, said control means, said variable speed hydraulic motor and said generator are in the form of a unitary assembly.

* * * * *